Figure 2A:
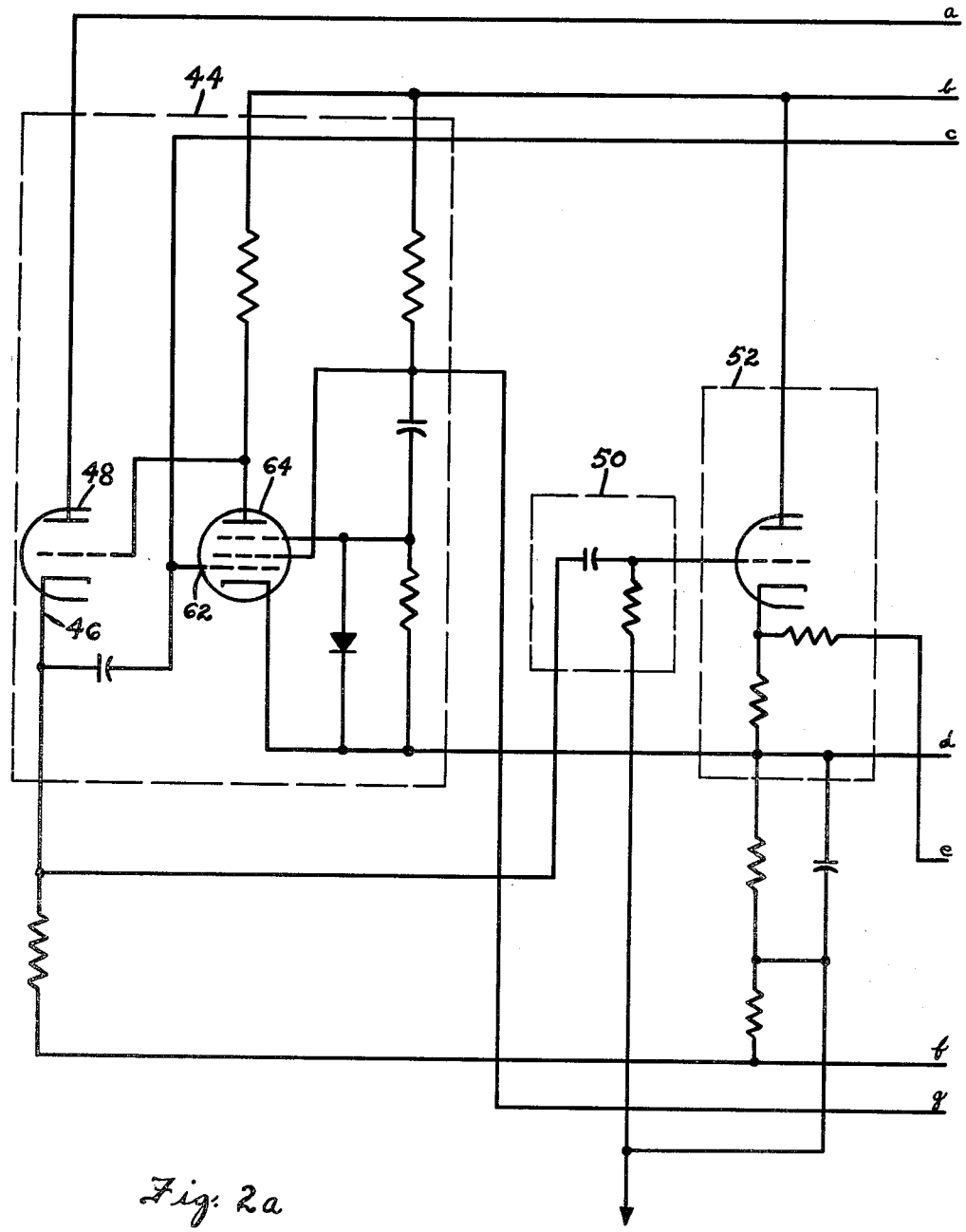

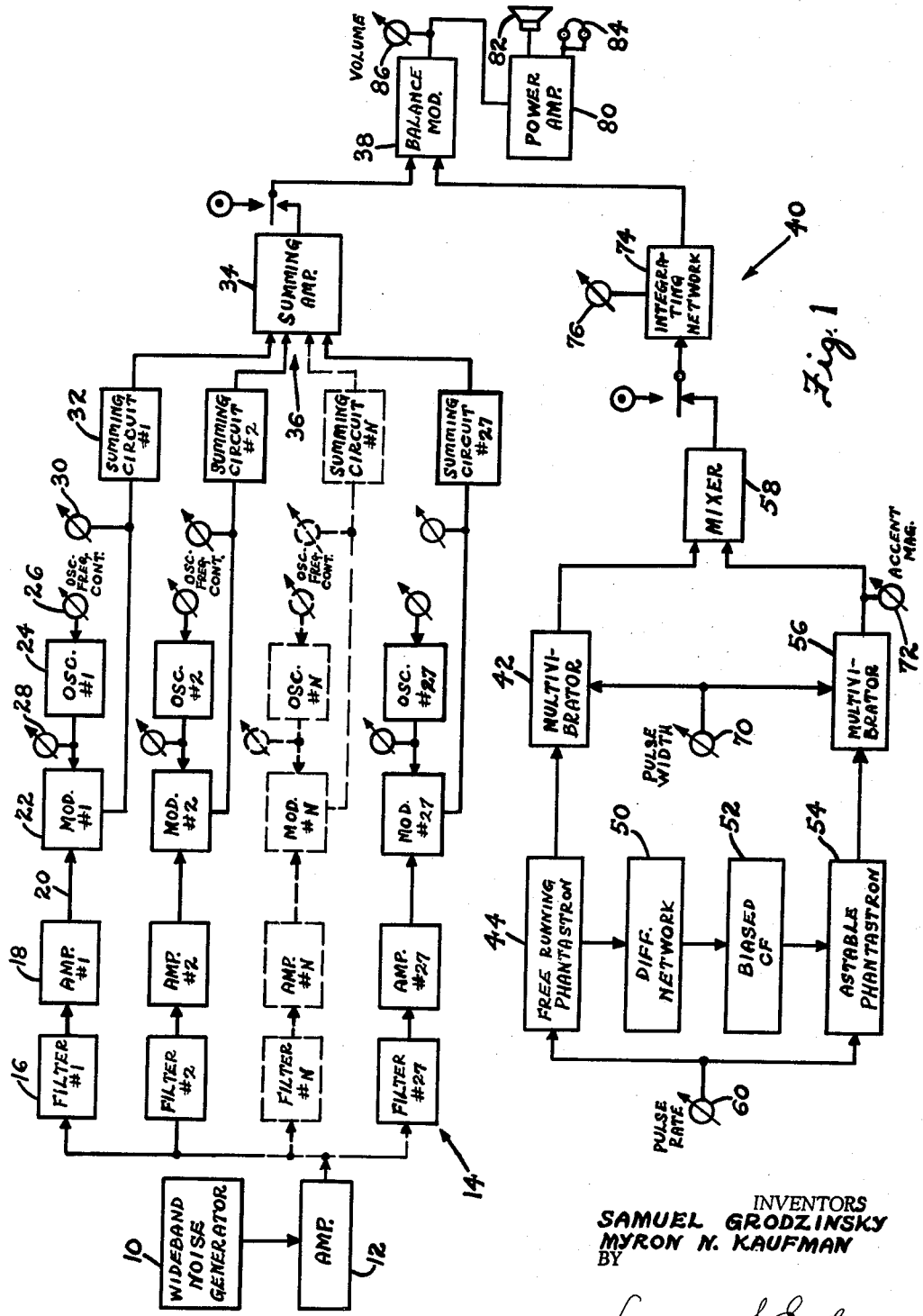

Jan. 12, 1965   S. GRODZINSKY ETAL   3,165,734
SCREW NOISE SIMULATION TECHNIQUE
Filed Nov. 2, 1961   4 Sheets-Sheet 3

INVENTORS
SAMUEL GRODZINSKY
MYRON N. KAUFMAN
BY
Lawrence S. Epstein
ATTORNEY

United States Patent Office 3,165,734
Patented Jan. 12, 1965

3,165,734
SCREW NOISE SIMULATION TECHNIQUE
Samuel Grodzinsky, East Meadow, and Myron N. Kaufman, Massapequa, N.Y., assignors, by direct and mesne assignments, to the United States of America as represented by the Secretary of the Navy
Filed Nov. 2, 1961, Ser. No. 149,633
10 Claims. (Cl. 340—384)

This invention relates to sound simulation and more particularly to the simulation of particular existing sounds by reproducing their characteristics.

Previously, sounds such as the sound of ships' propellers, as heard over sonar receiving devices, were simulated by using electronic and electro-mechanical techniques to modulate the output of a noise producing source into pulses resembling the characteristic beat of ships' propellers. This modulated signal would then be fed to a loudspeaker or set of earphones where the results of the simulation could be heard. Generally, controls were supplied for varying the shape of the beats so that it could be made to conform accurately to the characteristic beat of a number of different type ships. However, no controls were provided for varying the frequency distribution of the power from the noise source so that the tone of the sound heard over the listening devices usually did not resemble that of the sound being simulated and could not be changed from one sound simulation to the next.

The present invention overcomes these deficiencies of previous devices by providing a noise generator which divides the audible frequency range into a number of bands and then provides means to vary the distribution of the noise power output of each band so that the noise generator may be tailored to comply with specifications set up on the basis of a power distribution analysis of the sounds that are desired. Thus, the invention permits a more accurate simulation of sounds based on the results of certain analytical techniques. Therefore operators of sonar receiving devices may obtain first-hand knowledge of tone characteristics and are no longer dependent on subjective opinions of others which may vary greatly due to differences in background experience, psychological responses and anatomy of the ear.

Further, the previous methods of producing the beat were either cumbersome electro-mechanical devices such as the passing of light through holes in the peripheries of spinning wheels or all electronic circuits which use complicated circuitry to permit accenting of certain pulses to simulate unevenness in propeller blades. The present device uses an all electronic means of simulation with an accent control that permits simulation of the sound of propeller beats for most ships while not requiring over complicated circuitry.

Thus, it is an object of the present invention to more accurately simulate sounds.

Another object of the instant invention is to permit simulation of the tone characteristics of certain sounds.

A further object of the instant invention is to more simply simulate the beats of ships' propellers.

Figure 2B:
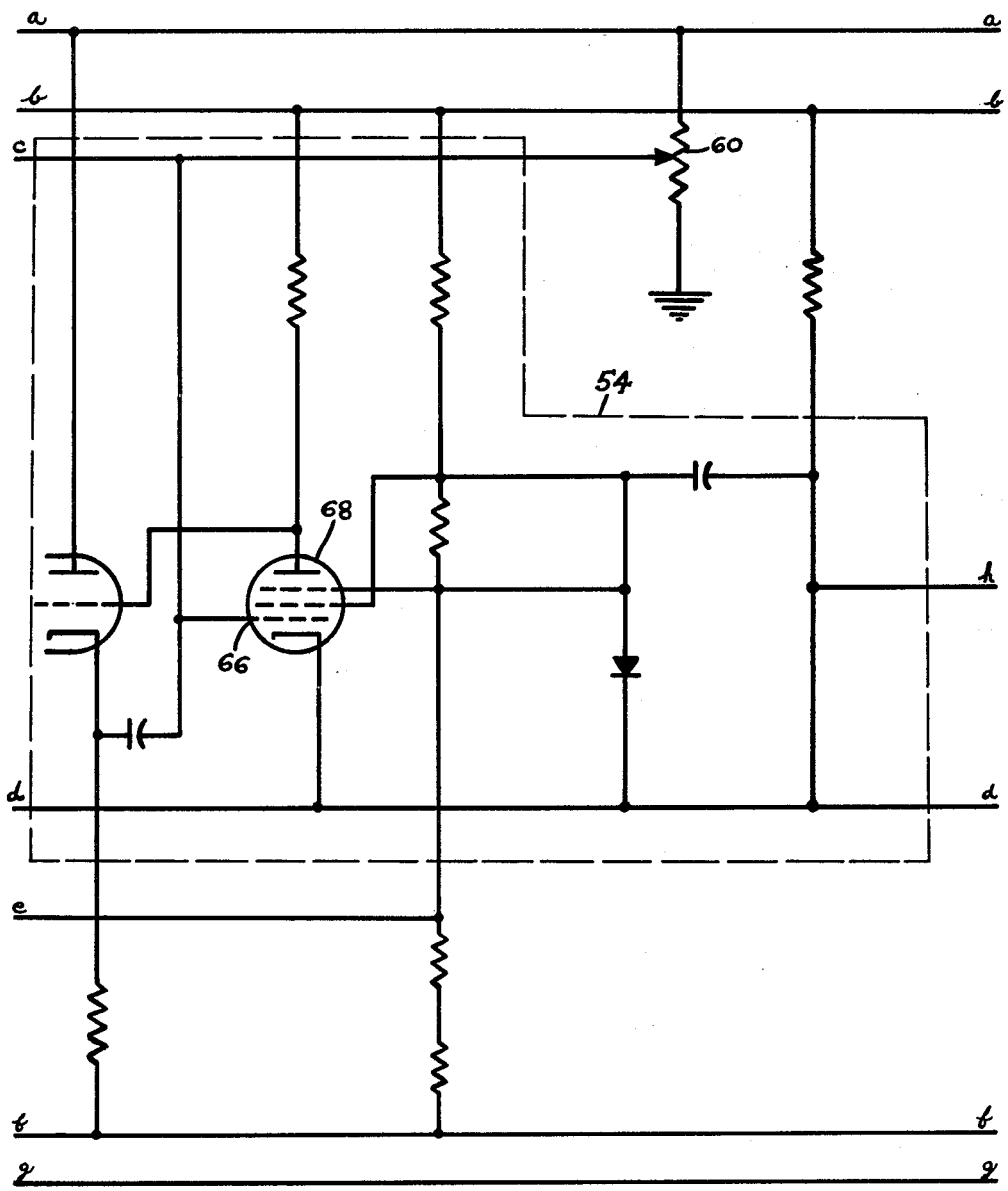
Figure 2C:
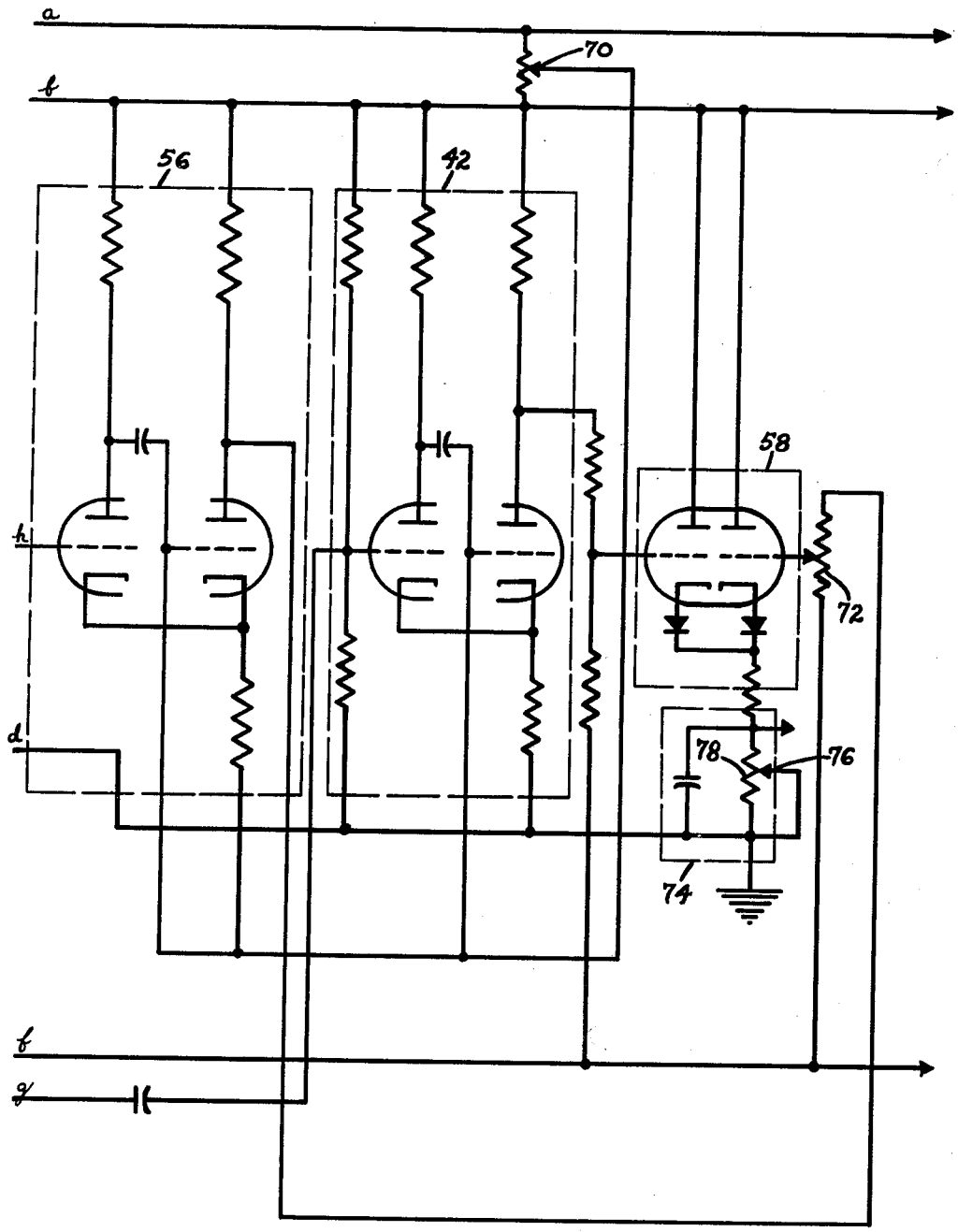

Other objects and many of the attendant advantages of this invention will be readily appreciated as the same becomes better understood by reference to the following detailed description when considered in connection with the accompanying drawings wherein:

FIG. 1 is a block diagram of the illustrated embodiment of the present invention; and FIGS. 2a, 2b and 2c, when placed side by side in the manner indicated, show an electrical schematic of the beat generator in the illustrated embodiment.

Referring to the drawings, it can be seen that the initial source of the signal is a noise generator 10 consisting of a gaseous discharge tube subjected to a transverse magnetic field so as to provide a noise signal uniform throughout the audible range. The noise generator is coupled through an amplifier 12 to a set of twenty-seven individual one-third octave band pass filters 14 matched so that each filter 16 covers a certain portion of the audible frequency range and the total audible frequency range is covered by the complete set 14. The output of each filter 16 in the set is individually passed through an amplifier 18 which provides the filter with a proper load impedance and provides the filter channel with controls for adjustment of the channel gain. These controls are adjusted to equalize the noise power output of all the filters at one specific output level. The equalized outputs 20 are then individually set into modulator 22 where each is modulated by the output of an RC phase-shift oscillator 24 with a range of approximately 1 to 10 cycles. One control 26 for varying the oscillating frequency and another 28 for changing the magnitude of the oscillator's output permit control over the frequency and the percent of modulation of the noise signals by the modulator. While a third control 30 at the modulator's output allows control of the maximum power output of each channel.

The output of each modulator 20 is A.C. coupled by a resistive summing network 32 to a summing amplifier 34 so that the output of the summing amplifier consists of the sum total of the outputs 36 of the twenty-seven filter channels each of which is set to produce a given maximum power ouput that varies a given magnitude at a fixed frequency. Thus, it may be seen that if the noise of a particular sound should be analyzed in ⅓ octave band segments for the percentage of the total audible energy within each band, the magnitude of the variation of this energy with time and the frequency of such variation, by setting the various controls in the modulators, an electrical representation of the noise may be obtained. With the characteristics of the background fixed in this manner the noise is shaped into the characteristic pulses of ships' noise by feeding the output of the summing amplifier 34 into a modulator 38 where it can be modulated by the output of a generator 40 producing the propeller beat pulse. The basic propeller beat pulses are produced by monostable multivibrator 42 which is triggered by a free running phantastron 44 so that by varying the repetition rate of the phantastron 44 the pulse rate of the multivibrator 42 and therefore the apparent speed of the ship is changed.

To provide accent to certain of the propeller blade pulses so that inequalities in blade size may be simulated, a signal from the cathode 46 of the triode 48 in the free running phantastron circuit 44 is differentiated in a differentiating circuit 50 and fed to a cathode follower 52 which is biased off so that the differentiating circuit output causes its conduction. The pulse thus produced by the cathode follower is fed into an astable phantastron 54 whose time base is such that it is triggered by every third such pulse. The output of the astable phantastron is then fed to a monostable multivibrator 56 to produce the accent pulse. This pulse is then summed with the basic propeller beat pulse in a mixer 58 to give a pulse train with every third pulse accented.

To assure synchronization of the accent pulses with the basic propeller blade pulses, variation of the repetition rate of the free running phantastron 44 should be accompanied by a similar variation in the rate of the astable phantostron 54. Therefore, the same resistive control 60 that controls the bias on the grid 62 of the pentode 64 of the free running phantostron 44 likewise controls the bias on the grid 66 of the pentode 68 in the astable phantastron 54 to assure synchronization. Similarly, one resistive control 70 is used to change the width of the output pulse of both monostable multivibrators 42 and 56 so that the accent pulse's width will remain in a proper relationship to the basic propeller blade pulse's width, as they are broadened to give a different character to the simulated ship's sound.

The magnitude of the accent pulse is controlled by a gain control 72 which varies the size of the pulse out of the accent multivibrator so that its size in relation to the main blade pulse is varied. The mixer therefore will put out a pulse train in which the degree by which every third pulse exceeds the others in magnitude may be varied. The pulse output of the mixer is applied to an RC shaping network 74 which integrates the pulse waveform slightly, resulting in a fast exponential rise and a slow exponential fall. The degree of this integrating may be controlled by the shaping control 76 that changes the time constant of the circuit by varying a resistor 78 in the RC network.

As pointed out previously, this signal is then routed to the balanced modulator where it is used to modulate the noise signal. The output of the modulator is then fed to an amplifier 80 which powers a speaker 82 or set of earphones 84 to be monitored by the observer. The volume of the sound is controlled by a control 86 at the amplifier's input.

Obviously many modifications and variations of the present invention are possible in the light of the above teachings. It is therefore to be understood that within the scope of the appended claims the invention may be practiced otherwise than as specifically described.

What is claimed is:

1. A device for simulating sounds produced by ships' propellers on sonar receivers comprising, a noise generating means, means apportioning said noise generating means into segments of octaves, said means being coupled to said noise generating means, means varying the distribution of noise content within each segment of an octave, summing means connected to said apportioning means, and beat means coupled to said summoning means to form the noise to the beat characteristics of the sound being simulated.

2. The structure of claim 1 wherein said apportioning means includes a multiplicity of band pass filter means dividing the generated noise into distinct frequency regions with controls to vary the amount of noise energy within these regions.

3. The structure of claim 2 wherein said controls includes means to vary the magnitude of the noise within such frequency regions as a function of time.

4. The structure of claim 3 wherein said controls includes means to amplitude modulate said noise.

5. The structure of claim 1 wherein said beat means includes means for varying the beat repetition rate, beat width and beat accent.

6. A device for simulating sounds produced by ships' propellers on sonar receivers comprising, a noise generating means, filter means coupled to said noise generating means for splitting the generated noise into several channels according to the frequencies of the noise, control means coupled to said filter means for varying the power output individually in each of the several channels to simulate the characteristic noise effects of the sound being simulated, summing means coupled to said filter means for summing the outputs of the filters, and shaping means to shape the summed output of the filters according to the beat of the simulated sound.

7. The structure of claim 6 wherein said control means is a modulating means where the gain and the frequency and the percentage of modulation are variable.

8. A device for simulating the sound produced by ships' propellers as may be heard over sonar receivers comprising means for reproducing the noise of the sound being simulated including a noise generator producing a noise signal substantially uniform throughout the audible range, a set of band pass filters coupled to the noise generator for dividing up noise signals produced by the noise source into a number of select frequency bands, control means coupled to the filters for varying magnitude of noise in each frequency band individually, summing means coupled to said filters for summing the outputs of the filters; a beat generator for producing the characteristic beat of the sound being simulated including variable time base means providing two different variable time bases, one the multiple of the other and one triggered by the other so they stay in synchronization, variable width pulse producing means being triggered by the time bases to produce two different trains of pulses, the repetition rate of one train being variable with one of the time bases and the repetition rate of the other train being variable with the other time base, summing means to sum the second pulse train to produce a third train of pulses with certain pulses accented, and shaping means which shapes the third pulse train; a modulating means coupled to said noise generating means and said beat generating means to form said noise generating means by said beat generating means whereby the sound being desired is simulated.

9. A device for simulating persistent and continuous sounds comprising
 a noise generating means,
 filter means coupled to said noise generating means for splitting the generated noise into several channels according to the frequency of the noise,
 control means on said filter means, persistent sound generating means,
 said control means and persistent sound generating means being interconnected, said control means varying the power output individually in each of the several channels to simulate the characteristic noise tone of the persistent sound being simulated,
 summing means coupled to said filter means for summing the outputs of said filters, and
 shaping means to shape the summed outputs of said filters according to the beat of the simulated sound.

10. A device for simulating sounds produced by ships' propellers on sonar receivers comprising,
 noise generating means,
 means apportioning said noise generating means into frequency bands to determine the tone characteristics of the noise,
 means summing said frequency bands,
 and beat means coupled to said summing means to form the noise beat characteristics of the sound being simulated.

References Cited by the Examiner
UNITED STATES PATENTS

| | | | |
|---|---|---|---|
| 2,483,226 | 9/49 | Newman | 250—36 |
| 2,521,405 | 9/50 | Phelep | 340—384 |
| 2,751,585 | 6/56 | Hathaway et al. | 340—384 |
| 2,840,639 | 6/58 | Graham | 179—1 |
| 2,898,587 | 8/59 | Nye | 340—384 |
| 2,521,405 | 9/60 | Phelps | 340—384 |
| 2,974,424 | 3/61 | Roberts | 340—384 |
| 2,977,584 | 3/61 | Siegel | 340—384 |
| 3,030,450 | 4/62 | Schroeder | 179—1 |

NEIL C. REID, *Primary Examiner.*
BENNETT G. MILLER, *Examiner.*